June 1, 1926.
J. E. GRAYBILL
1,587,072
COFFEE URN FAUCET
Filed March 29, 1922
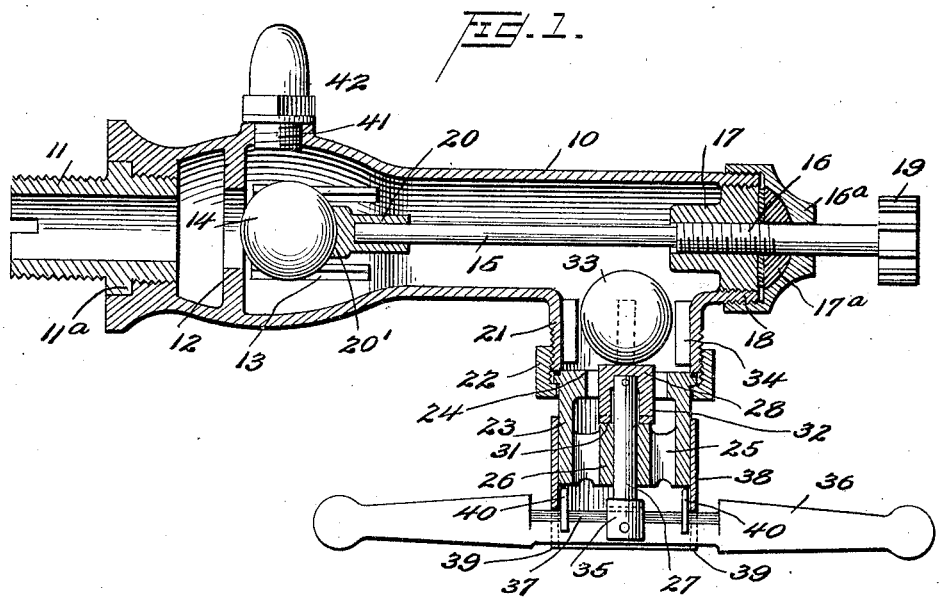
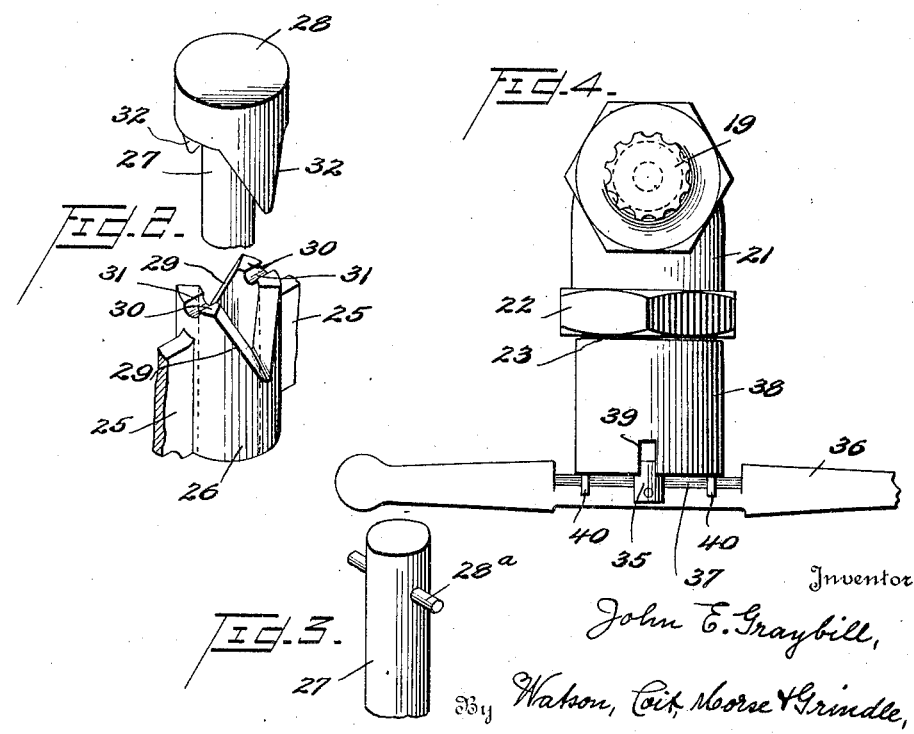
Inventor
John E. Graybill,
By Watson, Coit, Morse & Grindle,
Attorneys.

Patented June 1, 1926.

1,587,072

UNITED STATES PATENT OFFICE.

JOHN E. GRAYBILL, OF YORK, PENNSYLVANIA.

COFFEE-URN FAUCET.

Application filed March 29, 1922. Serial No. 547,845.

My invention relates to faucets of the type comprising a valve operated by a receptacle to be filled such as is commonly used on coffee urns, milk reservoirs or liquid dispensing apparatus generally. Its principal objects are to provide a faucet with a receptacle operated valve which may be either permanently held open or locked against accidental opening, to arrange the operating means so that spilling or spattering of the liquid is prevented, to prevent binding of the operating means, and to provide means for regulating the flow of liquid according to the head or pressure in the dispensing tank, and to arrange the faucet so that it may readily be cleaned.

My invention will be understood by reference to the accompanying drawings, in which:

Fig. 1 is a longitudinal section of a faucet made in accordance with my invention;

Fig. 2 is an enlarged perspective view of certain details of the valve actuating mechanism;

Fig. 3 is a modification of the valve actuating mechanism;

Fig. 4 is a front end elevation of the faucet with the operating bar locked in valve-closing position.

Referring to the drawings, the faucet comprises a body 10, of generally tubular shape which may be attached to an urn or other dispensing reservoir by a nipple 11 provided with a shoulder 11$^a$ and threaded into one end thereof. The portion of the body adjacent the inner end of the nipple is provided with a valve seat 12 and a short guideway 13 for a ball valve 14 which is for the purpose of controlling the flow of liquid through the faucet. The ball 14 is seated by means of a rod 15 disposed longitudinally in the body and threaded into the front thereof as at 16. If desired, a bushing 17 may be secured in the front of the tube at 18 in order to give a long thread support for the valve rod 15. A washer 17$^a$ of rubber or other suitable material is disposed around the rod 15 and held in place by the cap 16$^a$. The valve rod is operated from the front of the faucet by means of a knurled knob 19 rigidly attached thereto, preferably formed of heat insulating material, such as vulcanized fiber or the like. The valve end of the rod 15 has a soft portion which may be in the form of a sleeve 20 having a spherical recess 20′ in order to prevent denting or pitting of the ball in case the rod 15 is screwed in too hard.

Adjacent its front end, the body 10 has a vertically depending boss 21 externally threaded at its lower end to receive a coupling 22 by which the cup operated valve is attached. This valve comprises a casing 23, the upper end of which is provided with a ball seat 24. Supported in the casing, as by ribs 25 which may be cast integral with the casing, is a guide-way preferably in the form of a sleeve 26, in which the valve actuator 27 operates. This actuator is preferably in the form of a rod provided at its upper end with a cap 28 by which it is supported on the sleeve. The cap has one or more wedge surfaces 32 and the upper end of the guide is provided with a portion preferably made integral therewith having one or more deep notches 29 for allowing the cap to drop and one or more supporting surfaces 30 adjacent the mouths of the notches, which surfaces may be provided if desired with shallow notches 31 for receiving the points of the wedges, and thus holding the cap and actuator in valve opening position. The actuator 27 is reciprocable and rotatable in the guide. The ball valve 33 is disposed on the seat 24 and when seated, its lower surface is slightly above the normal position of the top of the cap 28. When the rod 27 is pushed up it will unseat the ball and open the valve. When allowed to drop the ball will be seated by gravity and close the passageway. The portion 21 of the delivery tube may be provided with vertically extending ribs 34 which form a guideway for the ball 33. At its lower end the rod 27 is enlarged as at 35 to form a support for an operating bar 36 which is secured in the portion 35 by a pin and allowed a slight pivotal movement. The upper side of the bar 36 is narrowed to an edge as at 37 in order to prevent spattering of the liquid. Upon the bar 36 is supported a sleeve 38 which fits closely outside the casing 23 and may be reciprocated or rotated thereon. The sleeve at its lower edge has notches 39 fitting over the bar 36 and thus allowing the sleeve to project to the bottom of or slightly below the bar. Inside the sleeve on the rod are two small plates 40 which are adapted at all times to close the notches. The sleeve is both for the purpose of preventing spilling of the liquid and locking the bar in inoperative position.

In the upper side of the body 10 and between the valve 14 and the delivery end is an opening 41 which may be closed by a plug 42. This is for the purpose of allowing cleaning of the faucet or if desired for attaching a gauge glass.

Referring to Figure 3 it will be seen that the upper end of the actuator 27 may be provided with a pin 28ª which is a substitute for the cap 28 and serves to support the rod 27 and to hold it in valve open position.

In the operation of my device the valve 14 is adjusted by the knob 19 at the front of the faucet to give the desired flow of liquid through the delivery tube for any head of liquid in the dispensing apparatus, being opened more for low heads than for high. The ball valve 33 is normally seated by gravity on the seat 24 and liquid cannot flow through the faucet. When it is desired to draw liquid the receptacle to be filled is pushed up against the bar 36 which thereby unseats the valve and allows the liquid to run out. Removal of the receptacle allows the bar to drop, the ball seats and the flow of liquid is instantly stopped. The bar 36 is given a slight pivotal movement so that in case the receptacle is not presented squarely to the faucet the bar will adjust itself to the inclination of the receptacle before being pushed up; therefore the resultant force will be applied at the pivot rather than on one side of it and binding of the rod 27 in the guide will be prevented. When the bar is rotated to position the cap as shown in Figure 2, the release of the bar will allow the valve to seat, whereas if it is desired to hold the valve open, the bar 36 is rotated one-quarter turn and the wedges 32 are positioned over the supporting surfaces 30 and the rod cannot drop.

As the bar 36 is pushed up and down the sleeve 38 reciprocates along the casing and since it extends below all parts in the path of the liquid it serves to direct the liquid downward and prevent all lateral spattering. Since when the bar 36 is tilted only one of the notches will lift the sleeve, the other notch will be open and liquid will run along the rod or spatter out through the open notch. Therefore means must be provided to prevent liquid from splashing out. The two plates or vanes attached to the rod serve to maintain the notches closed at all times when the bar is operated. The notches normally cause the sleeve to rotate with the bar 36 but if it is desired to lock the bar in inoperative position the sleeve may be elevated independently of the bar and rotated so that the notches do not register with the bar. The upper edge of the sleeve will then bear against the coupling and raising of the bar will be prevented.

In case it is desired to clean the faucet without emptying the reservoir, as for instance when the reservoir is filled with milk, the valve 14 is closed, the valve 33 held open and the faucet flushed through the opening 41.

It will be understood that the invention is not limited to the details shown but includes modifications and changes within the scope of the appended claims.

Having thus described the invention what is claimed as new and desired to be secured by Letters Patent is:

1. In a faucet, in combination, a valve casing, a valve-actuator in the casing, a bar extending below and across the casing and connected to the valve-actuator, and a sleeve reciprocable along said casing and supported by the bar, the sleeve extending below the casing and to the bottom of the bar and being adapted to prevent spattering of liquid flowing out of the faucet.

2. In a faucet, in combination, a valve casing, a valve-actuator in the casing, a bar extending across the casing and adapted to reciprocate the valve-actuator to valve open and closed positions, and a sleeve supported by the bar around the casing and having notches to normally register with the bar, the sleeve being reciprocable along the casing and also rotatable to carry said notches out of registry with the bar and lock the bar in valve closing position.

3. In a faucet, in combination, a valve casing, a valve-actuator in the casing, and a bar extending across and below the casing and adapted to operate the valve-actuator, the upper side of the bar being formed as an edge to prevent spattering of liquid flowing through the faucet below the casing and means on said bar to prevent longitudinal flow of liquid therealong beyond the inner walls of said casing.

4. In a faucet, in combination, a valve casing, a valve actuator in the casing, a bar extending across the casing and connected to the actuator, a sleeve supported by the bar around the casing, the sleeve having notches to register with the bar, and members on the bar for closing the notches.

5. In a faucet, in combination, a valve casing, a valve actuator in the casing, a bar extending across the casing and pivotally connected to the actuator, a sleeve supported by the bar around the casing, the sleeve having notches registering with the bar and members on the bar for closing the notches.

6. In a faucet, in combination, a valve casing, a guideway within the casing, a valve actuator rotatable and reciprocable in the guideway, a transverse operating bar connected to said actuator and cooperating surfaces on the guideway and on the actuator, the surfaces being adapted when the bar is in one position to hold the actuator in valve opening position, and adapted when the bar is rotated to another position to allow the actuator to move to valve closing position.

7. In a faucet, in combination, a valve casing, a guideway within the casing, a valve actuator rotatable and reciprocable in the guideway, a transverse operating bar pivotally connected to said actuator, and cooperating surfaces on the guide-way and on the actuator, the surfaces being adapted when the bar is in one position to hold the actuator in valve opening position, and adapted when the bar is rotated to another position to allow the actuator to move to valve closing position.

8. In a faucet, in combination, a valve casing, a valve actuator rotatable and reciprocable in the casing, a transverse operating bar connected to the actuator, and cooperating positioning members attached one to the casing and the other to the actuator, one of said positioning members having a notch and a supporting surface adjacent the mouth of the notch, and the other positioning member having a wedge surface, said positioning members being adapted to hold the actuator in valve opening position when the bar is in a position for the engagement of said wedge surface with said supporting surface and to allow it to move to valve closing position when the bar is in a position for engagement of said wedge surface in said notch.

9. A faucet comprising in combination, a valve casing, a valve actuator rotatable and reciprocable in the casing, a transverse operating bar connected to the actuator, and cooperating positioning members attached one to the casing and the other to the actuator, one of said positioning members having a relatively deep notch and a relatively shallow notch adjacent thereto, and the other positioning member having a wedge surface, said positioning members being adapted to hold the actuator in valve opening position when the bar is in a position for the engagement of said wedge surface in said shallow notch and to allow it to move to valve closing position when the bar is rotated in a position for the engagement of said wedge surface in said deep notch.

10. A faucet comprising in combination, a valve casing, a sleeve within the casing terminating at its upper end in a surface having a relatively deep and relatively shallow notch, a valve actuator rotatable and reciprocable in the sleeve, a positioning member on said actuator, and a transverse operating arm connected to the actuator, the positioning member being adapted to engage in said shallow notch and hold the actuator in valve opening position when the bar is in one position and to engage in said deep notch and allow the actuator to move to valve closing position when the bar is rotated in another position.

11. A faucet comprising in combination, a valve casing, a sleeve within the casing terminating in a notched surface, an actuator in the sleeve, an operating bar pivotally attached to said actuator, and a cap supporting the actuator in the sleeve, the cap being provided with a wedge surface adapted when in one position to cooperate with the notched surface to hold the actuator in valve opening position or when in another position to allow it to move to valve closing position.

12. A faucet comprising in combination, a body portion, a valve at the front end of the body portion adapted to be operated by a receptacle to be filled, and a valve at the back end of the body, operated from the front end and adapted to adjustably control the flow of liquid through the body.

13. A faucet comprising in combination, a body portion, a valve at the front end of the body adapted to be operated by a receptacle to be filled, a valve at the back end of the body adapted to control the flow of liquid through the body, and a rod extending through the front of the body having a knob thereon adapted to operate the last mentioned valve.

14. A faucet comprising in combination, a body portion, a valve at the front end of the body adapted to be operated by a receptacle to be filled, a valve seat at the back end of the body, a spherical valve cooperating with the seat, and a rod extending through the front of the body adapted to seat the spherical valve, the valve end of the rod being softened to prevent deformation of the valve.

In testimony whereof I hereunto affix my signature.

JOHN E. GRAYBILL.